(12) United States Patent
Sharma et al.

(10) Patent No.: US 7,286,682 B1
(45) Date of Patent: Oct. 23, 2007

(54) SHOW-THROUGH WATERMARKING OF DUPLEX PRINTED DOCUMENTS

(75) Inventors: Gaurav Sharma, Webster, NY (US); Shen-Ge Wang, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 889 days.

(21) Appl. No.: 09/652,291

(22) Filed: Aug. 31, 2000

(51) Int. Cl.
   *G06K 9/00* (2006.01)
(52) U.S. Cl. ..................................... 382/100
(58) Field of Classification Search ............... 382/100, 382/101, 118–120; 358/3.06
   See application file for complete search history.

(56) References Cited

U.S. PATENT DOCUMENTS

| | | | |
|---|---|---|---|
| 4,149,194 A | 4/1979 | Holladay | |
| 4,960,272 A | 10/1990 | Wierszewski et al. | |
| 5,202,772 A * | 4/1993 | Muir | 358/1.9 |
| 5,313,253 A | 5/1994 | Martin et al. | |
| 5,673,121 A | 9/1997 | Wang | |
| 5,734,752 A | 3/1998 | Knox | |
| 5,790,703 A | 8/1998 | Wang | |
| 5,824,447 A * | 10/1998 | Tavernier et al. | 430/124 |
| 5,859,955 A | 1/1999 | Wang | |
| 6,252,971 B1 * | 6/2001 | Wang | 382/100 |

OTHER PUBLICATIONS

"Merriam-Webster's Collegiate Dictionary" 10th Edition.*
Sharma, Gaurav and Trussell, H. Joel, "Digital Color Imaging", IEEE Transactions On Image Processing, vol. 6, No. 7, Jul. 1997, pp. 901-932.

* cited by examiner

*Primary Examiner*—Matthew C. Bella
*Assistant Examiner*—Tom Y Lu
(74) *Attorney, Agent, or Firm*—Fay Sharpe LLP

(57) ABSTRACT

A printing apparatus and method for duplex printing a document having a show-through watermark wherein the watermark is comprised of first and second images on both sides of the document. The images comprise stoclustic halftone screens having a substantially common registration wherein the second image is relatively shifted from the first image for forming an associated overlay pattern between the first and second images resulting in a recognizable pattern comprising the watermark upon illumination by a show-through light source. The watermark is unrecognizable from either image alone upon illumination from a front light source. The relative shifting can be implemented by either phase, frequency or angle shifting between the front and back side images.

4 Claims, 9 Drawing Sheets

SHOW-THROUGH WATERMARKING OF DUPLEX PRINTED DOCUMENTS

FIELD OF THE INVENTION

The subject invention relates to the art of image/text printing, and is especially applicable to a method and apparatus wherein duplex printing (printing the front and back sides of a document) is implemented in a manner for forming a visible watermark upon show-through illumination of the document. The watermark results from halftone pattern interaction between the front and back images on the document, but is invisible upon mere front-lit illumination of either of the sides.

BACKGROUND OF THE INVENTION

Conventional watermarks, such as are produced by the pressure of a projecting design, as in the mold, during the manufacturing process of paper are well known. The watermark can be seen when the paper is held up and back-lit by show-through illumination. The watermark is intended not to be visible when the paper is not held up, e.g., at rest on a desk and front-lit by incident illumination. Watermarks are useful for authentication purposes or identification of an origin or author of the resident document.

Much of the printing in today's business and scientific world is accomplished electronically, such as with digital color printer engines, which inherently provide only a limited number of output possibilities due to their binary nature, i.e., they produce either a dot or no dot at a given pixel location. Pressure formed watermarks can only be incorporated into the original paper stock in such printers and cannot be inserted at the time of printing.

The well known notion of halftoning (representing a continuous tone image with a binary representation) can produce an image including rapidly varying spatial patterns normally not visible to a human visual system, but artifacts thereof can be, especially those generated by interaction between adjacent or overlaying printing patterns.

A number of different techniques may be used for generating a halftone image from a continuous tone representation [Note R. Ulichney, "Digital Halftoning", MIT Press, Cambridge, Mass., 1987 and J. P. Allebach, Ed., "Selected Papers on Digital Halftoning", SPIE, Bellingham, Wash., and G. Sharma, "Digital Color Imaging", IEEE Transactions on Image Processing, Vol. 6, No. 7, July 1997, pp. 901-932]. In one commonly used technique, over a given image area having a number of contone pixels therein, each pixel value of an array of pixels is compared to one of a set of preselected thresholds and a decision is made whether to produce a dot or no dot at the pixel location in the output binary halftone based on the result of the comparison (the thresholds may be stored as a dither matrix and the repetitive pattern generated by this matrix is considered a halftone cell) as taught for example in U.S. Pat. No. 4,149,194 to Holladay.

The dither matrix of threshold values is often referred to as a "screen", and the process of generating the binary image from the contone image using the screen is called "screening" or dithering. Conventional digital halftones start as a number of isolated dots that grow bigger as more colorant is requested on the paper. These screens are referred to as clustered-dot screens. The fundamental rate at which the dots in a clustered dot screen are repeated is commonly referred to as the screen's spatial frequency [Note, R. Ulichney, "Digital Halftoning", id.]. The higher the screen spatial frequency, the finer and smoother appearing the image and also the greater is the capacity for the dots to represent fine detail in the image.

Stochastic or non-periodic screening is an alternative to conventional clustered dot screens. Instead of producing dots that grow with increased colorant on paper, the stochastic screening method produces a well-dispersed pattern of isolated dots at spaced pixel locations. Thus there is no fundamental periodicity in the dots, instead the design of the screen attempts to produce patterns with pleasant noise characteristics. The pleasant noise characteristics are achieved by designing the screen so as to distribute the noise energy in the region of high spatial frequency, where the human visual system has a significantly reduced sensitivity. In this respect, U.S. Pat. No. 5,673,121 to Wang, discloses a stochastic halftone screening method for designing an idealized stochastic screen. Watermarking documents through the introduction of correlations in adjacent regions of a stochastic screen in the screen design process is disclosed in U.S. Pat. No. 5,734,752 to Knox and U.S. Pat. No. 5,790,703 to Wang.

A system utilizing halftone outputs produced by stochastically clustered pixel screens, referred to as "stoclustic" screens (U.S. Pat. No. 5,859,955 to Wang) combines the advantages of both cluster halftone and stochastic halftone screens. The use of stoclustic halftone screens for watermarking of images through the use of suitable halftones is also known and disclosed in related U.S. application Ser. No. 09/069,095 to Wang and is incorporated herein by reference as it discloses a particular clustered-dot screen design method useful in implementation of the subject invention, as will be more fully explained below. But this method requires that the watermark detection is performed by either electronic scanning and image processing of the printed image or by overlaying a distinct transparency on a printed image containing the watermark for effectively interacting the distinct screen transparency with the printed image. Watermark identification requiring scanning and additional image processing or via a separate transparency document is inconvenient and undesirable. Such problems are intended to be overcome by the present invention.

Duplex printing is fairly common for increased paper use efficiency, and for the subject invention is exploited for the selective interaction of images on both sides of the document to effectively achieve an overlaying of patterns forming a desired watermark upon show-through illumination.

BRIEF SUMMARY OF THE INVENTION

In accordance with the present invention, a method and apparatus is provided for duplex printing of a document for forming a show-through watermark thereon upon back-lit illumination. The front pattern is printed on the front side of a document and the back pattern is printed on the back side of the document. The front and back patterns are disposed for interacting in back-lit illumination to produce a recognizable marking, wherein the marking is not visible upon only front-lit illumination.

In accordance with another aspect of the present invention, either one or both of the front and back patterns are adjusted for forming the intended interacting, and the adjustment primarily comprises at least one of phase, frequency or angle shifting of halftone dots. The patterns preferably comprise clustered-dot halftone screens, though others methods of screen-based or screen-less halftoning could also be used.

In accordance with yet another limited aspect of the present invention, when the shifting comprises a phase shift, the shifting of the phase of the halftone screen for either one or both of the front and back images comprises a shift embedded in the screen. The watermark comprises significant local variation in brightness resulting in a pattern clearly visible to the human eye.

In accordance with yet another aspect of the present invention, when the shifting comprises a shifting in angle of frequency, the watermark comprises a moiré pattern.

One advantage of the present invention is a method and apparatus for forming a watermark in a merely electronically printed document.

Another advantage of the subject invention is the formation of the watermark in a duplex printing process without severe registration requirements between front and back images on the document.

Yet another advantage of the subject invention is the formation of the watermark through a variety of alternative interaction effects between the images such as phase, angle or frequency shifting.

Yet another advantage of the subject invention is the formation of a recognizable marking in an electronically printed document suitable for authenticating or identifying the document.

Other advantages and benefits of the present invention will become apparent to those of ordinary skill in the art upon a reading and understanding of the following detailed description of the preferred embodiments.

BRIEF DESCRIPTION OF THE DRAWINGS

The invention may take form in various components and arrangements of components. The drawings are only for purposes of illustrating the preferred embodiments and are not to be construed as limiting the invention. Where:

FIGS. 3a-3c show halftone patterns wherein the phase of the pattern of FIG. 3b is shifted from FIG. 3a and wherein FIG. 3c shows a consequence of overlapping the patterns of FIGS. 3a and 3b;

DETAILED DESCRIPTION OF THE PREFERRED EMBODIMENTS

Figure 1:
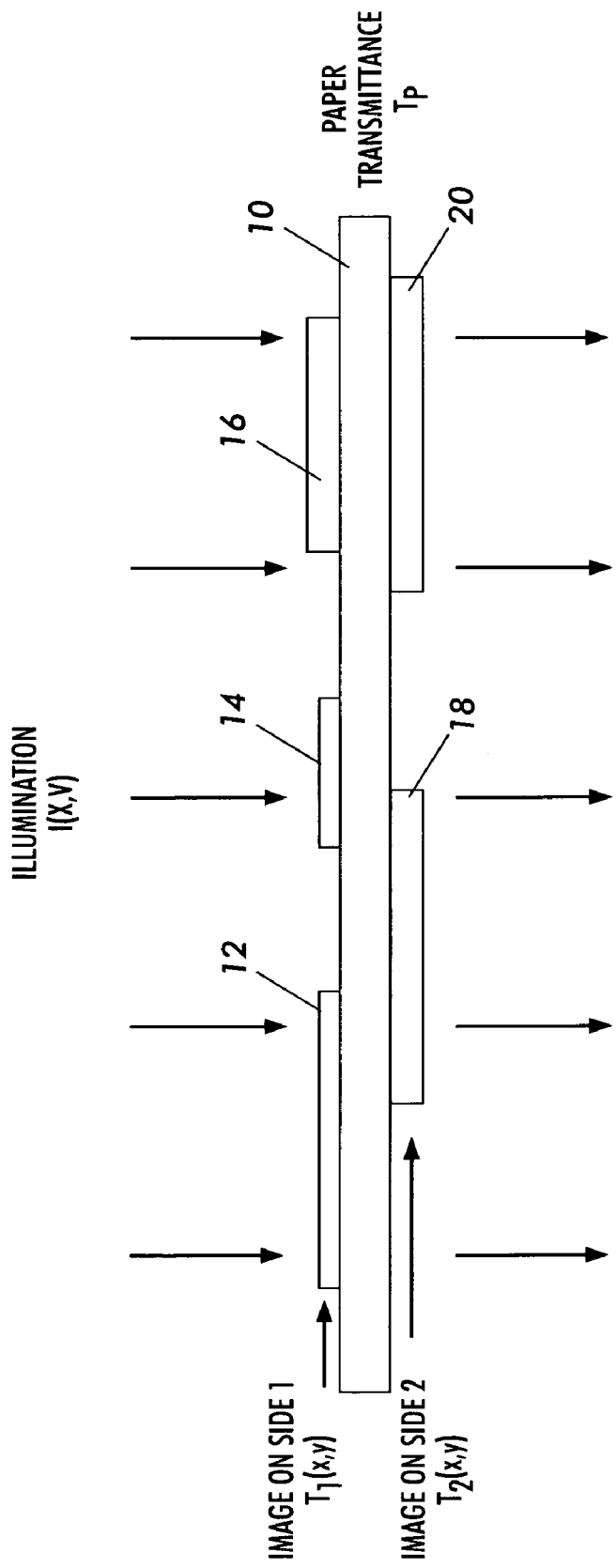
FIG. 1 is a cross-sectional view of a document having the printed images on the front and back sides of the document.

Referring now to the drawings wherein the showings are for purposes of illustrating preferred embodiments of the invention only and not for limiting same, the invention describes a way of halftoning a duplex printed document for forming a show-through watermark visible from the document upon back-lit illumination. For a duplex printed document, the images are printed on both the front and back sides of the document and these images are effectively overlaid if the document is held up and viewed in a show-through mode with a light on the back of the page.

FIG. 1 graphically illustrates a show-through illumination for document 10 having a transmittance $T_p$ and having a printed image on side one $T_1(x,y)$ comprised of halftone cells 12, 14, 16 and another image on side two, $T_2(x,y)$ comprised of cells 18, 20. A mathematical representation of the image seen upon show-through illumination is $I(x,y)T_1(x,y)T_pT_2(x,y)$, wherein the illumination is represented by $I(x,y)$, and $T_1(x,y)$ and $T_2(x,y)$ represent the transmittances of the images printed on side one and side two, respectively. Viewing the document with back-lit illumination thus results in the multiplicative combination of the images printed on the front and the back-side. The present invention embeds a distinct visible pattern in this show-through image by designing the halftone images printed on the two sides such that their multiplicative combination results in a visible artifact corresponding to the distinct visible pattern.

In the following description, it will be assumed that the halftone output is black and white and the illumination profile $I(x,y)$ is uniform and given by a constant value I. It should be recognized that these assumptions are introduced for clarity of description and are not intended to limit the scope of the invention. The invention is just as applicable to the printing of color images and is especially intended for such applications in accordance with the same halftoning patterns as are herein described for black and white.

For ideal black and white halftone images, the image transmittances $T_1(x,y)$ and $T_2(x,y)$ are binary functions taking the value 0 over regions where dots are printed (indicating no light is transmitted) and 1 where no dots are printed (indicating all light is transmitted). The image seen in show-through, i.e., $I\, T_1(x,y)T_pT_2(x,y)$ (FIG. 1) therefore takes the value 0 at pixel locations where there is printing on at least one side (because at least one of $T_1(x,y)$ or $T_2(x,y)$ is zero) and a value $I\, T_p$ in regions where there is no printing on either side. Consequently, the image seen in show-through is lighter at pixel locations on the page with no printing on either side in comparison to pixel locations that have printing on at least one side. In actual practice, the halftone transmission profile is not ideal and there is spreading of light in paper, however, the qualitative characteristics of the above description still hold.

Figure 2A:
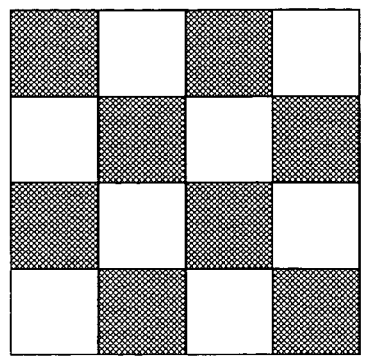
FIGS. 2a-2c show a particular halftone pattern and alternative overlap patterns thereof.
Figure 2B:
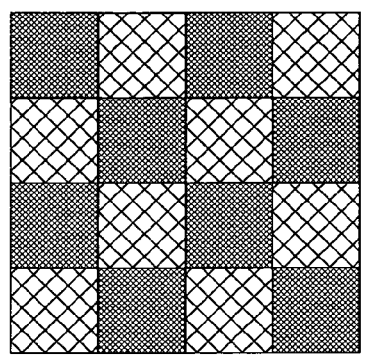
Figure 2C:
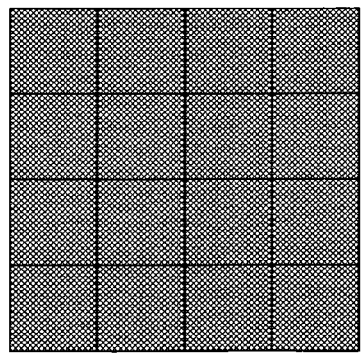

Consider the case when the halftone patterns to be printed on both sides are identical and correspond to a 50% area coverage in a checkerboard pattern as shown in FIG. 2a. If the halftone patterns printed on the two sides are exactly in phase, i.e., the printed and the non-printed regions of the checker-boards on the two sides are exactly aligned, the image seen in show-through is also a checker-board image which is dark in the region with printing on both sides and light in the region with no printing on either side, as shown in FIG. 2b. If the halftone patterns printed on the two sides are completely out of phase, i.e., the printed regions of the checker-boards on either side are exactly aligned with the unprinted regions on the other side, the image seen in show-through is dark throughout, as shown in FIG. 2c. Therefore, if the halftone patterns on the two sides are perfectly out of phase, the average image (which is what the eye perceives) seen in show-through appears darker in comparison to the case when the halftone patterns on the two sides are perfectly in phase. For intermediate phase alignment, the average image also takes on an intermediate value between the two extremes of exact phase agreement and complete phase disagreement.

It is a feature of the subject invention that the halftone patterns printed on the two sides are generated so as to have a spatially varying phase difference between the front and the back side patterns which generates a recognizable artifact upon back-lit illumination in the form of a local variation in the brightness of the show-through image. The artifact is configured in a readily identifiable form as a watermark.

A spatial variation in the phase agreement between the front and back side halftone patterns can be introduced by adjusting the phase of either the front-side, or the back-side halftone or both halftones. For most current day printers, the registration between the front and back side images is usually poor over the extent of the document due to non-uniformities in the printing process (nonlinearity in the motion of the laser used in the printer for writing the pixels onto paper, non-uniform paper motion, etc.) It is therefore beneficial to incorporate the variation in phase in the halftone pattern on a single side keeping the phase on the other side relatively constant (apart from any slow variations due to the effects mentioned earlier). Incorporation of the phase variation in a single side makes the method robust to any mis-registration errors between the two sides.

It is a principal feature of the subject invention, as will be noted below, that the use of clustered-dot halftone screens for back side and front side imaging particularly facilitates the formation of the watermark through a phase variation embedded in the halftone pattern on one side. The watermark, or other hidden information, formed by overlaying screens in show-through is based on cluster-to-cluster correlation and is much easier to visibly detect than pixel-to-pixel correlation which is confounded by the spreading of light in paper.

Stoclustic halftone screens (as described in U.S. Pat. No. 5,859,955 to Wang) provide the freedom to locate clustered print dots "arbitrarily". This feature enables the creation of clustered-dot halftone screens that can embed of local phase shifts.

Figure 3A:
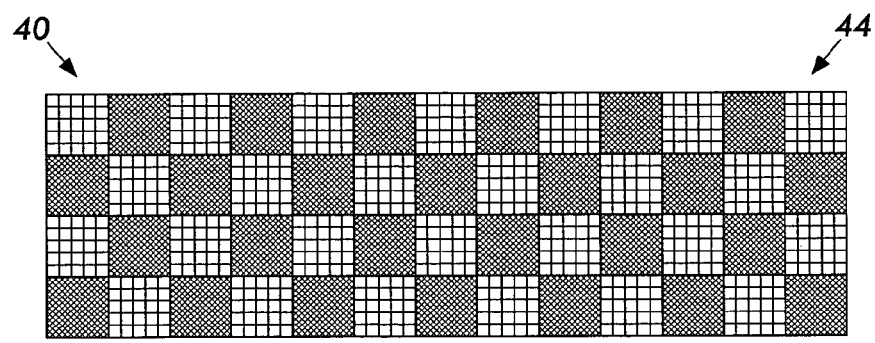
Figure 3B:
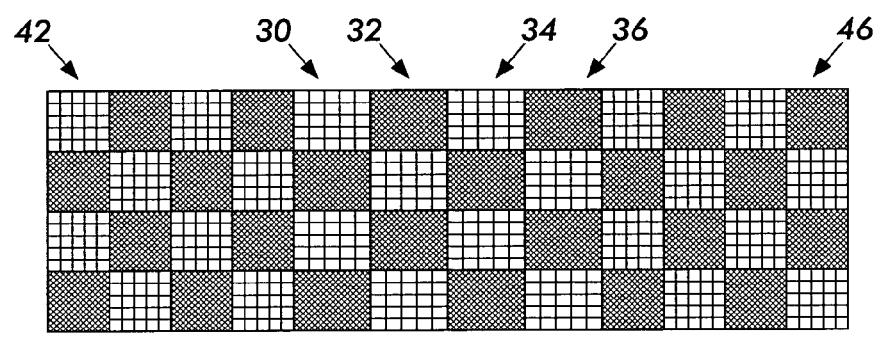

FIGS. 3a and 3b show halftone patterns where FIG. 3a is a checkerboard pattern created by a regular 45-degree cluster halftone screen. FIG. 3b is similar to FIG. 3a with four slightly stretched columns 30, 32, 34, 36 in the middle portion of the Figure. Due to pitch difference of the two patterns in the respective Figures, the phase measuring the transition between white and black cells is changed from in phase (0 shift) on the left portions 40, 42 to the opposite phases (180° shift) on the right in the last columns 44, 46.

Figure 3C:
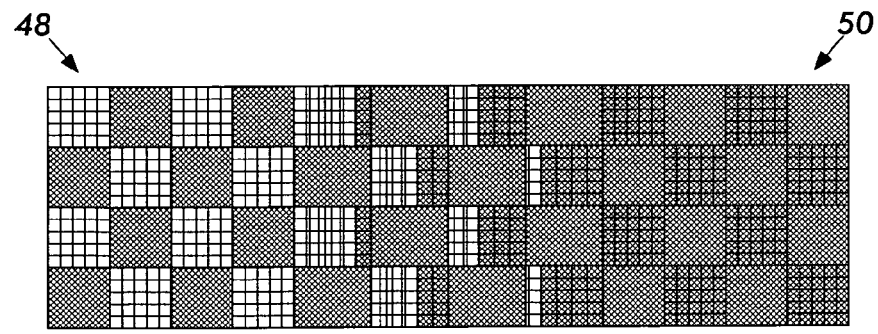

When the halftone patterns of FIGS. 3a and 3b are overlapped together, a rather easily recognizable high contrast between the left and right portions of the figure is formed as shown in FIG. 3c. In other words, it can be seen that the left portion 48 of FIG. 3c is easily identifiable as much lighter in color portion than the right portion 50.

As described earlier, when halftones are printed on both sides of a page and viewed with back-lit illumination, the overlaying of the patterns on the front and back sides is automatically accomplished. So, if one-side of a duplex printed page has a halftone pattern with almost no spatial phase variation and the other side's halftone pattern incorporates a spatial phase-shift in the halftone pattern from 0° to say X°, the phase-difference between the sides will also go through a X° change over the spatial region with the phase shift. This variation in phase-difference will produce a distinct visible artifact in the form of a spatial variation in the brightness. If X=360, i.e., the halftone pattern goes through a complete phase-cycle, the phase difference between the halftone patterns on the two sides will also go through a complete cycle and result in a brightness variation covering the full range possible, with the brightness being the highest where the phase-difference between the halftone-patterns on the two sides is zero, and the lowest where the phase difference between the two sides is 180°. The choice of the phase shift amount X may involve additional considerations such as non-perceptibility of the resulting shifts in halftone images.

Figure 4:
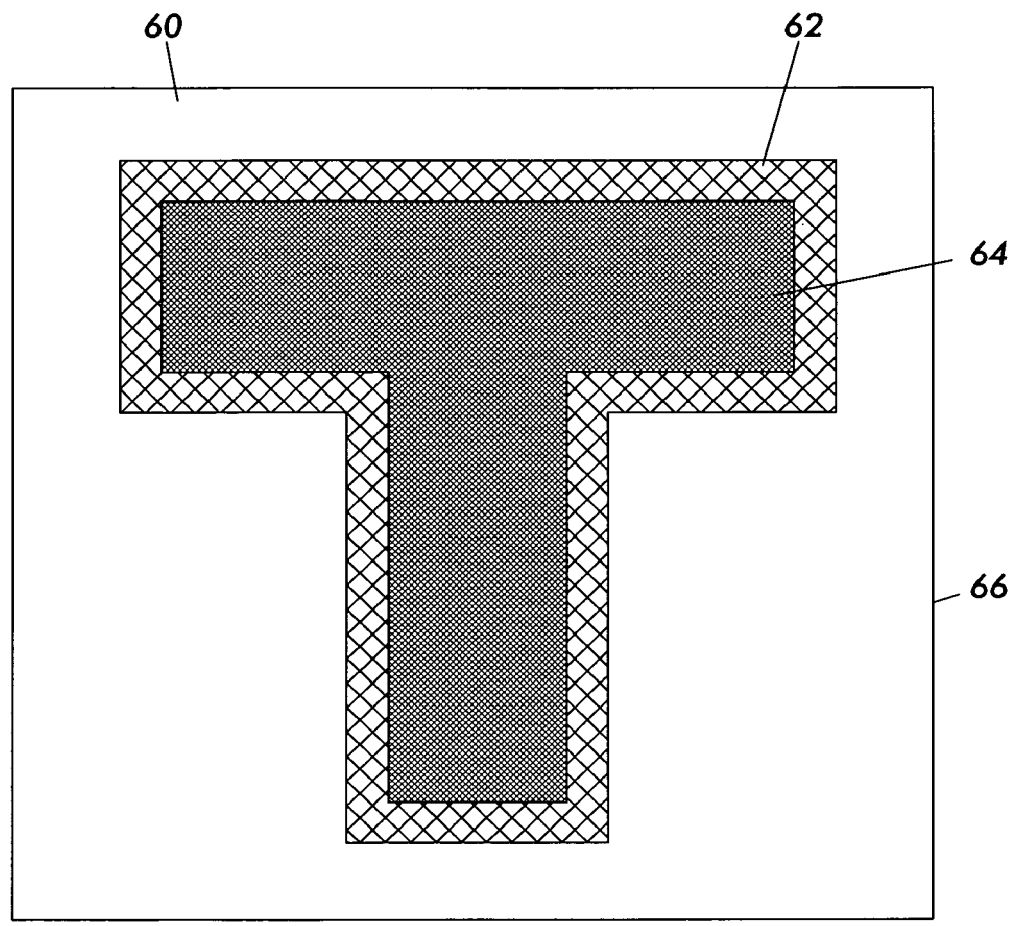
FIG. 4 illustrates an exemplary watermark of the kind that can be generated by the subject invention.
Figure 5:
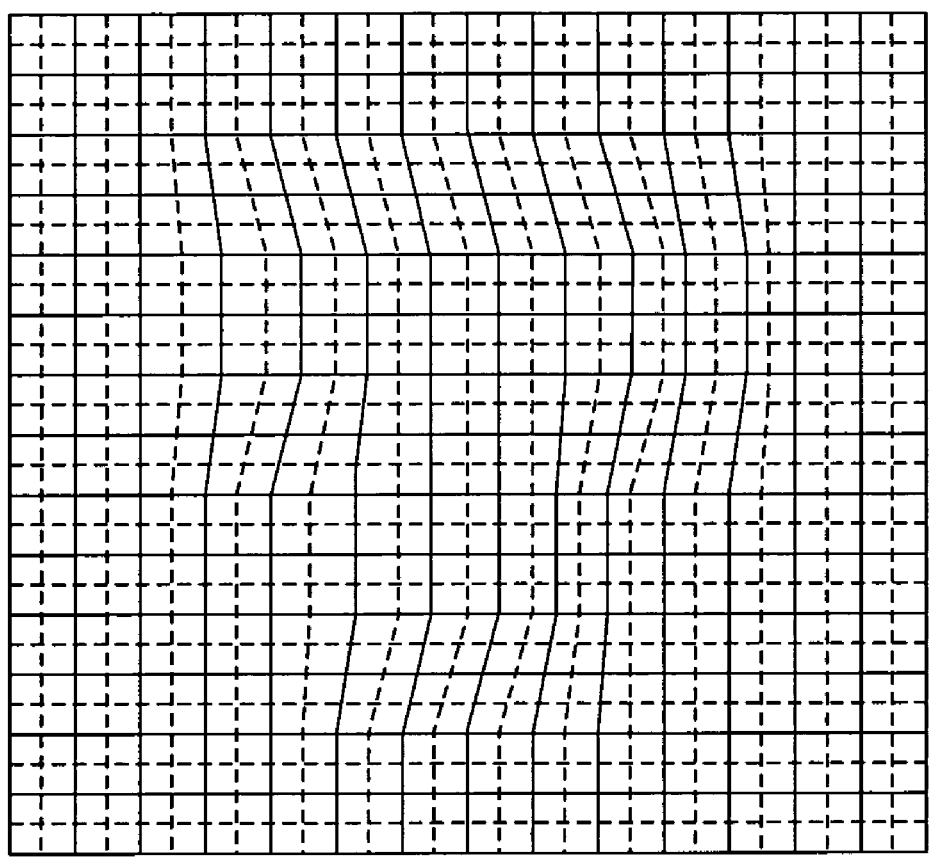
FIG. 5 shows a composed stoclustic screen capable of generating the watermark shown in FIG. 4.

In order to obtain a watermark in a given shape, a clustered halftone screen incorporating a phase shift is created. A watermark in the shape of a letter T can be created by a phase shifting adjustment in the halftone screen as shown in FIG. 4, where the complete screen includes a sub-region in the shape of T over which the screen has a phase shift of 180° in relation to the background. In particular, the area 60 ambient to the distinct visible pattern (i.e., "T") has zero phase shift. A transition region 62 surrounds the T region and is also in the shape of a T, over which the phase shift is gradually introduced so as to avoid the introduction of visible artifacts in the image due to a sudden phase shift. A full phase shift region 64 (i.e., 180° phase shift) clearly forms the intended variable pattern. The screen incorporating the phase shift may be designed directly or may be composed of phase-shift halftone tiles that are composed together to produce the overall screen. FIG. 5 shows a composed stoclustic screen for forming the T watermark of FIG. 4 wherein the solid lines indicate the contour of phase tiles having a phase zero, and the dash lines, the contour of phase 180°. The individual halftone tiles may be obtained for example, by using the methods disclosed in pending U.S. patent application Ser. No. 09/069,095. What the actual result of this example, when printed in duplex mode and viewed under back-lighting, would then appear like to an operator is approximated in FIG. 6a.

In order to insert the halftone into a duplex printed page, one side of the page is printed using the above-described phase shift halftone screen and the other side is printed using a halftone screen with no phase shift. When the document is held up for show-through viewing (with a backlight), the phase shift over the transition region will show-up as a variation in brightness of the show-through image, thereby making the outline of the T visible as the watermark.

Figure 6A:
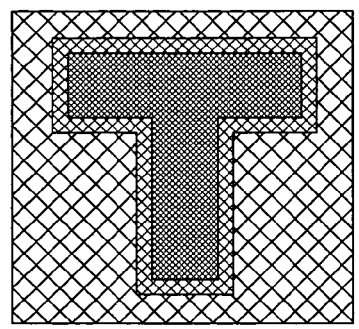
FIGS. 6a-6c are diagrammatic illustrations approximating how watermarks formed in accordance with the present invention would appear upon show-through illumination.
Figure 6B:
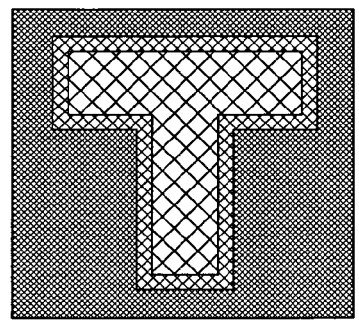
Figure 6C:
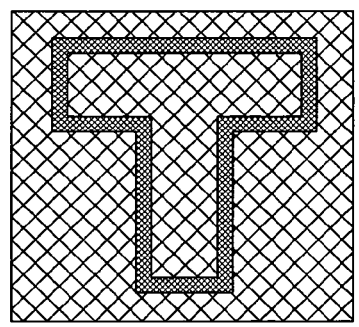

The phase difference between the halftone patterns on the front and the back side in the non-phase shifted region of the watermark bearing screen is referred to as the "native phase-difference". The exact nature of the visible watermark pattern depends on this native phase-difference. This dependence variation is illustrated in FIGS. 6a, 6b and 6c, which represent the visible watermark seen for native phase-differences of 0°, 180°, and 90°, respectively. If the native phase difference is zero (FIG. 6a), the watermark is visible as a dark T with a lighter surrounding region, because the halftones on the two sides are completely in phase over the background and completely out of phase over the T. Likewise, if the native phase difference is 180° (FIG. 6b), the watermark is visible as a light T, surrounded by a relatively dark surrounding region. If the native phase difference is 90° (FIG. 6c), the inside of the T and the outside have the same brightness but the watermark is still visible as the outline of the T corresponding to the brightness variation produced in the phase change region. For intermediate values of the native phase difference, the visible watermark lies somewhere between these three extremes.

If good registration between the front and the back sides can be achieved, one can control the appearance of the watermark to correspond to any of the above-mentioned three extremes or any intermediate appearance by adjusting the native phase difference. This can be accomplished for instance by a simple shift of the halftone screen. If reasonably good registration of the front and back sides is not possible, the native phase difference may take any value between 0° and 180° and produce a corresponding visible watermark pattern. Note, however, that the watermark is always visually distinguishable even with no control of the registration of the front and back side printing.

It is an important feature of the invention that when either side of the document (FIG. 1) is viewed only the halftone gray image printed on that side is seen and no watermark is apparent. However, when the page is held against the light and viewed, the T of FIG. 4 is visible over the portion of the image where the phase shift watermark is embedded in the screen.

Figure 7:
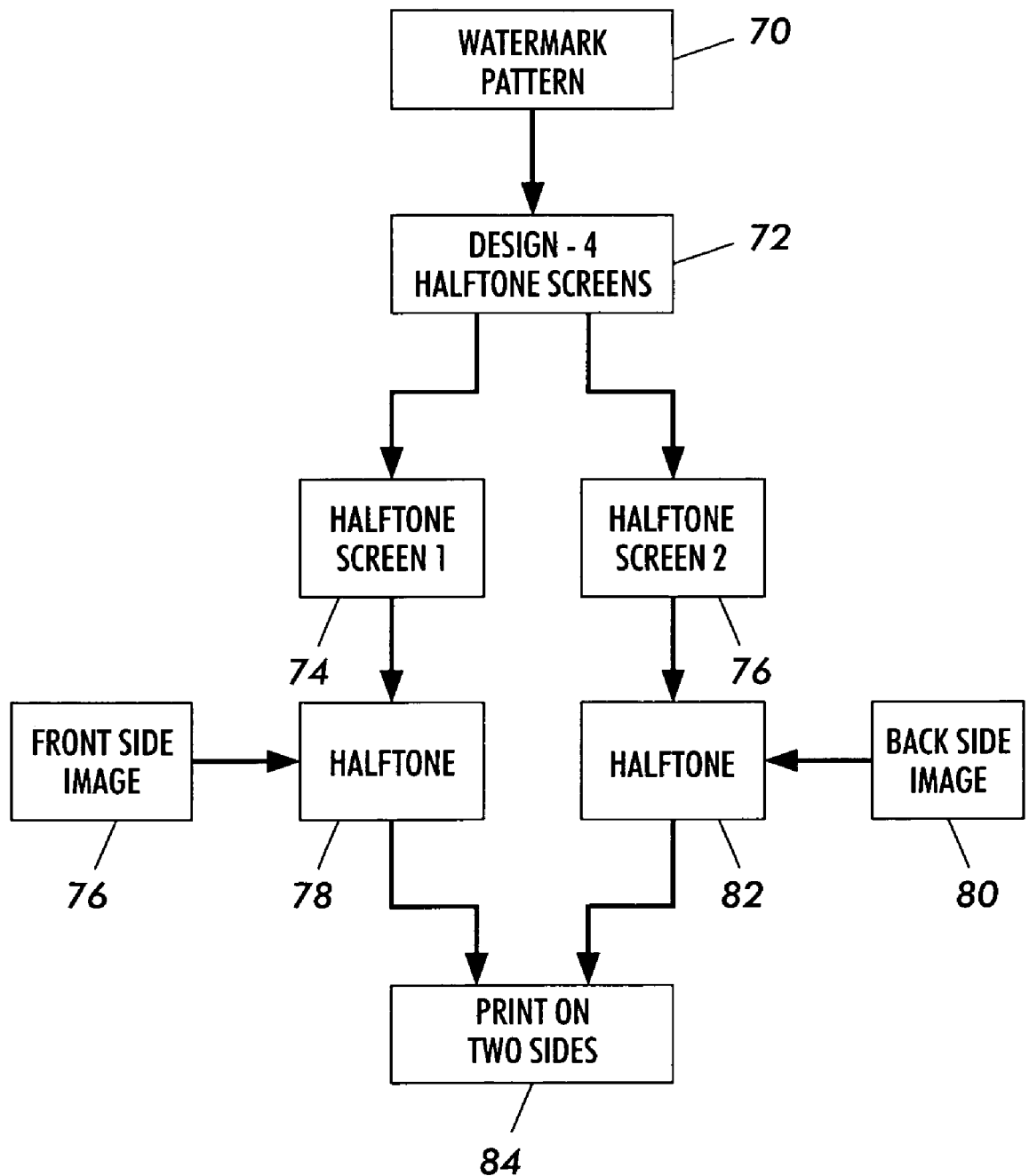
FIGS. 7 and 8 are alternative flowcharts of the steps for forming a watermark in a duplex printing operation in accordance with the present invention; and, FIG. 9 is an apparatus for duplex printing of documents.

With reference to FIG. 7, a block diagram/flowchart for the subject invention embodiment is illustrated. An intended watermark pattern 70 is predetermined which will result in an interaction causing a distinct visible pattern corresponding to the watermark. Accordingly, front and back side halftone screens must be designed 72 which, when overlapped, will cause the pattern. The screens thus must be different, and in accordance with the preferred embodiment, will embed a phase shift as in the example discussed above. Halftone screen one 74 and halftone screen two 76 are imparted to a controller wherein a front side image 76 is printed 84 on a first side of the document in accordance with halftoning pattern 78. The back side of the document is printed 84 with the back side image 80 in accordance with halftoning 82 so that the duplex printed document forms the show-through watermark.

Figure 8:
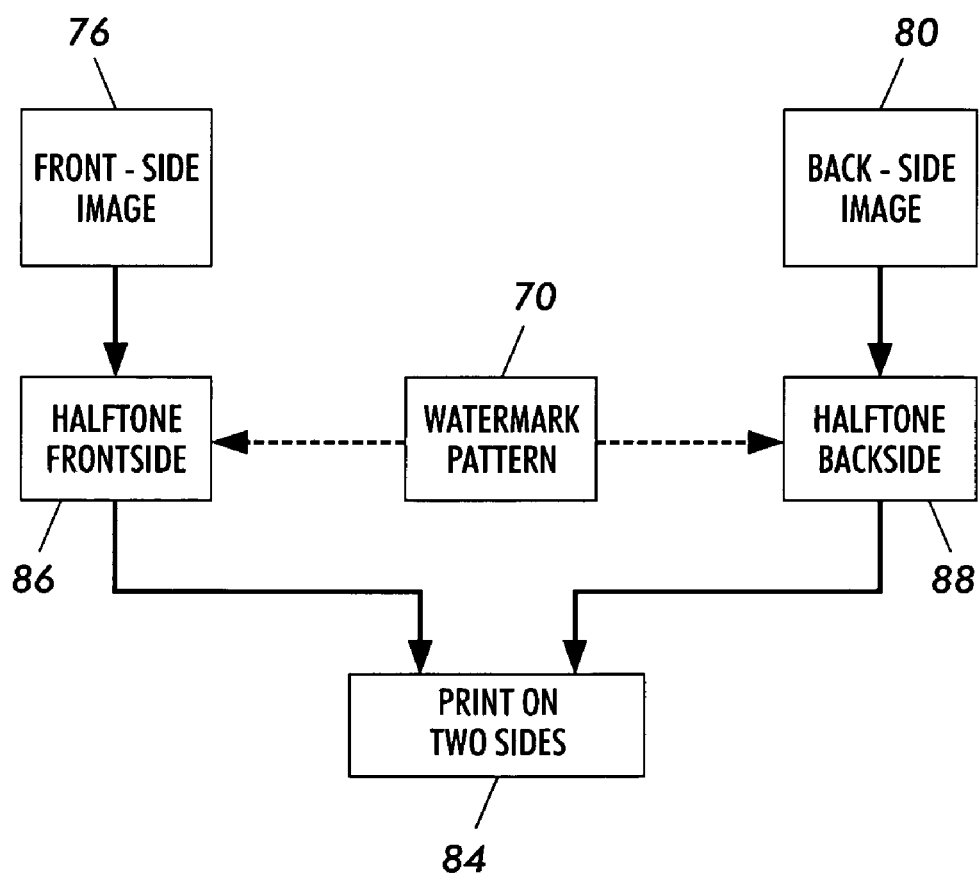

FIG. 8 shows an alternative flowchart wherein the front and back side images 76, 80 are predetermined and the halftoning of the front side and back sides 86, 88, is determined in consideration of the watermark pattern 70. The result of the printing on two sides 84 is the same. Note that the watermark pattern may be used to influence the halftoning process for either one side or both sides, either directly in the halftoning process or through incorporation in the halftone screen.

Figure 9:
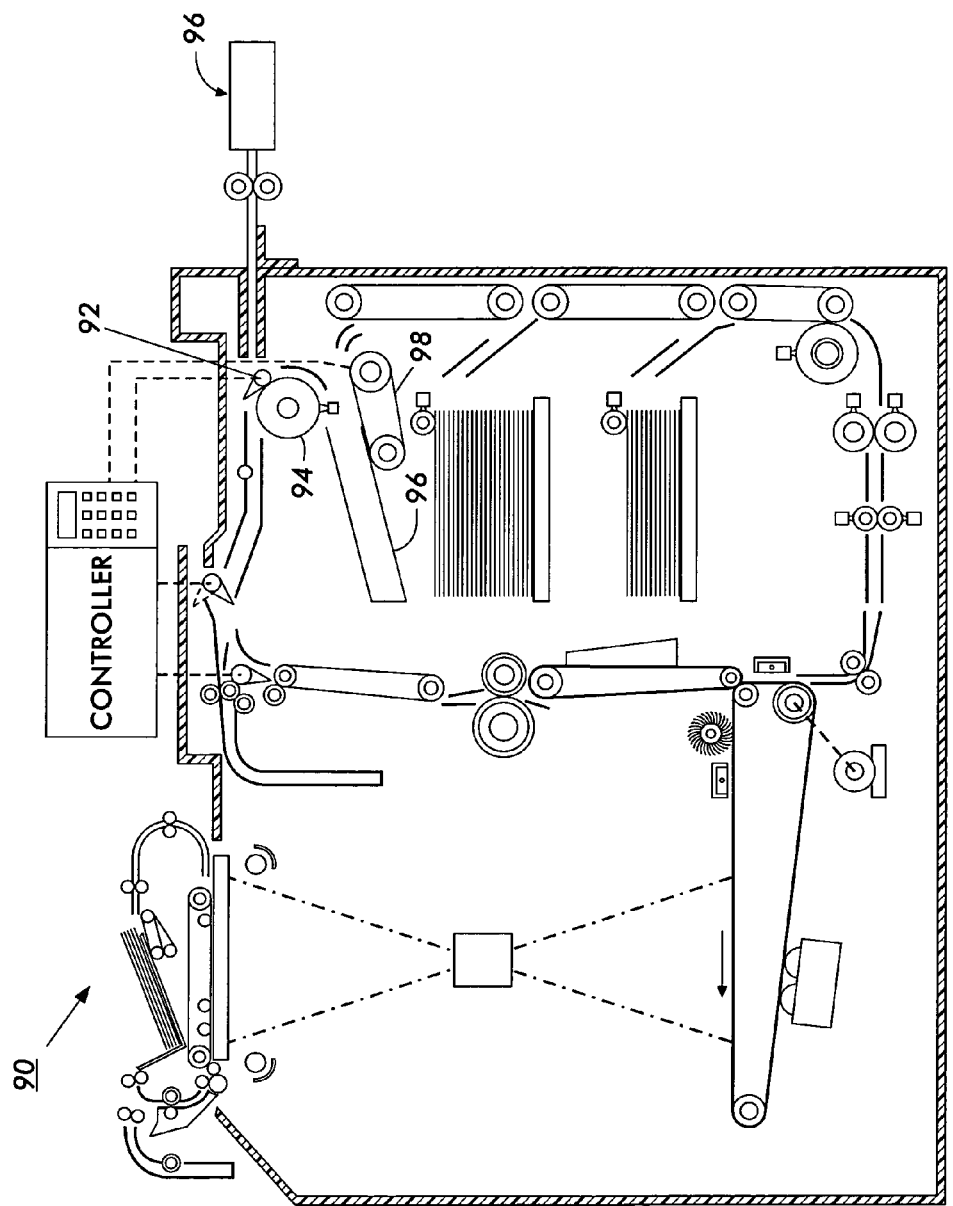

With reference to FIG. 9, duplex printers 90 are well known and the apparatus disclosed in the Figure is discussed in much greater detail in other U.S. patents as, for example, U.S. Pat. Nos. 4,960,272 or 5,313,253. A decision gate 92 may divert successive copy sheets to duplex inverter roll 94 or onto a transport path to finishing station 96. When gate 92 diverts the sheet onto inverter roll 94, roll 94 inverts and stacks the sheets to be duplexed in duplex tray 96. Tray 96 provides an intermediate or buffer storage for those sheets that have been printed on one side and on which an image that will be subsequently printed on the second, on both sides thereof, i.e., the sheets being duplexed. The simplex sheets in tray 96 are fed, in seriatim, by bottom feeder 98 from tray 96 for transfer of the toner powder image to both sides of the copy sheets.

The area of interaction between the front and back side images which is most susceptible to proper formation of an intended watermark preferably comprises areas of a constant mid-level gray. Since the watermark is embedded in the halftone screen, there are typically multiple repetitions of the watermark over the printed page. Thus, if the intended watermark viewed in the show-through illumination tends to get masked by other image details in the regions where the images on one or both sides are rapidly varying, a repetitive pattern of the watermark hopefully can still form a visible portion in the regions in which the image is relatively uniform, such as the sky or water. If an image is to be printed only on one side of the sheet, a mid-level gray pattern may be printed on the other side to produce the show-through watermark. The show-through watermark can also be produced by printing overlapping constant mid-level gray patches on the two sides, where front-lit viewing of either side shows only a mid-level gray patch.

The invention has been described above, with reference to a specific embodiment based on phase shift clustered-dot screens. Alternate embodiments of the invention are possible. In particular, the watermark may be embedded in the screen as a spatial variation in halftone frequency or angle. In addition, the variation of phase, frequency or angle may be used with other halftoning methods that may or may not use a screen. Where the adjustment of the halftoning screen is other than phase shift, such as frequency or angle shifting, the watermark is visible as moiré between the screens on the front and back side. An objective of developing either an angle or frequency shifting watermark is to develop one without visible artifacts in front side illumination of either of the front or back side images.

The invention is described with reference to the preferred embodiments. Obviously, modifications and alterations will occur to others upon the reading and understanding of the proceeding detailed description. It is intended that the invention be construed as including all such modifications and alterations insofar as they come within the scope of the appended claims or the equivalents thereof.

Having thus described the invention, we now claim:

1. A method of generating a show-through pattern on a duplex-printed document through selective disposition of halftone patterns on opposite sides of a paper document comprising steps of:

printing a first image on a first side of the document in a first halftone pattern; and, printing a second image different from the first image on a second side of the document in a second halftone pattern wherein the first and second halftone patterns present the first and second images upon front-lit illumination respectively, and are disposed to form a recognizable marking produced through a local phase shift of the printed halftone dots comprising a multiplicative halftone pattern interaction forming the show-through pattern and which show-through pattern is distinct from the first and second images upon illumination from a show-through light source.

2. The method as defined in claim 1 wherein the recognizable marking comprises a variation in moiré pattern and the first and second halftone patterns are obtained by utilizing a first and a second clustered-dot halftone screen and the second halftone screen incorporates the phase shift in dot pattern in the shape of the said recognizable marking.

3. A duplex-printed paper document having a show-through watermark comprising a selective overlay between a first image on a first side of the document and a second image distinct from the first image on a second side of the document, the first and second images comprising independent and different images respectively to a viewer upon front-lit illumination, and wherein the images comprise halftone dots relatively adjusted through a phase shift for multiplicative cooperating to form the watermark upon illumination of the document from a show-through light source wherein the watermark is produced through a combination of the halftone dots between the first and second sides of the document.

4. A method of duplex printing a paper document for forming a show-through watermark thereon upon back-lit illumination comprising steps of:

printing a front pattern on a front side of the document; and, printing a back pattern on a back side of the document wherein the front and back patterns present independent images of distinctive patterns respectively upon front-lit illumination and wherein the patterns are disposed for interacting upon back-lit illumination to produce a recognizable marking, produced through a local phase shift of printed halftone dots, wherein the marking is not recognizable upon only front-lit illumination of the independent images.

* * * * *